March 23, 1954

L. F. WASSON 2,672,830

DEVICE FOR DROPPING CREAMY SUBSTANCES IN MAKING CANDY WAFERS

Filed Feb. 16, 1953

L. F. Wasson
INVENTOR

BY C. A. Snow & Co.
ATTORNEYS.

March 23, 1954  L. F. WASSON  2,672,830
DEVICE FOR DROPPING CREAMY SUBSTANCES
IN MAKING CANDY WAFERS
Filed Feb. 16, 1953  2 Sheets-Sheet 2
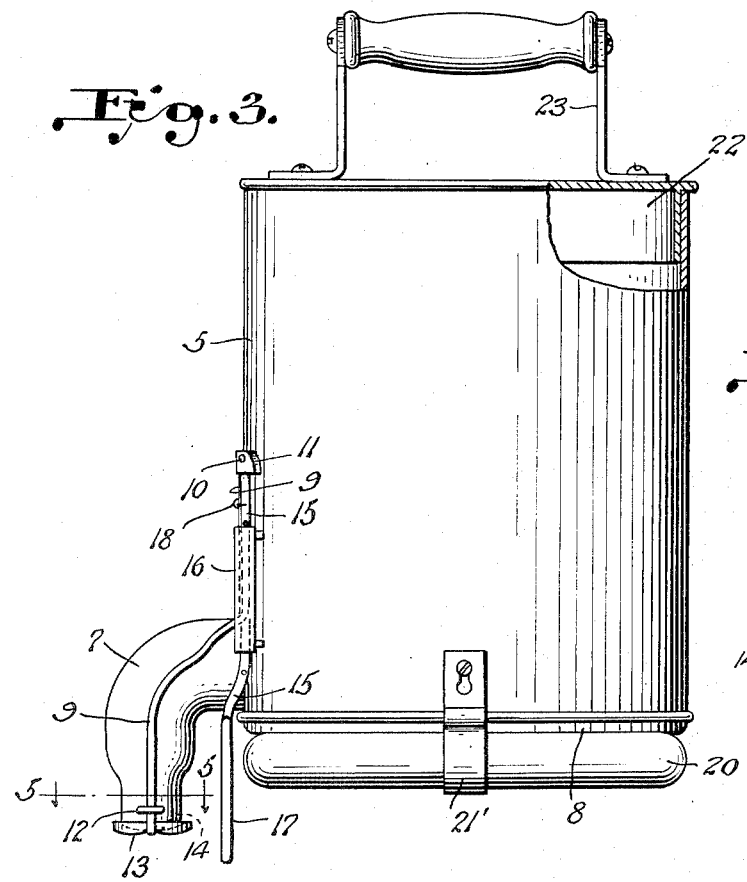
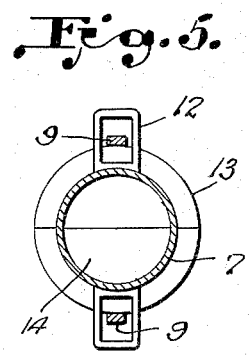
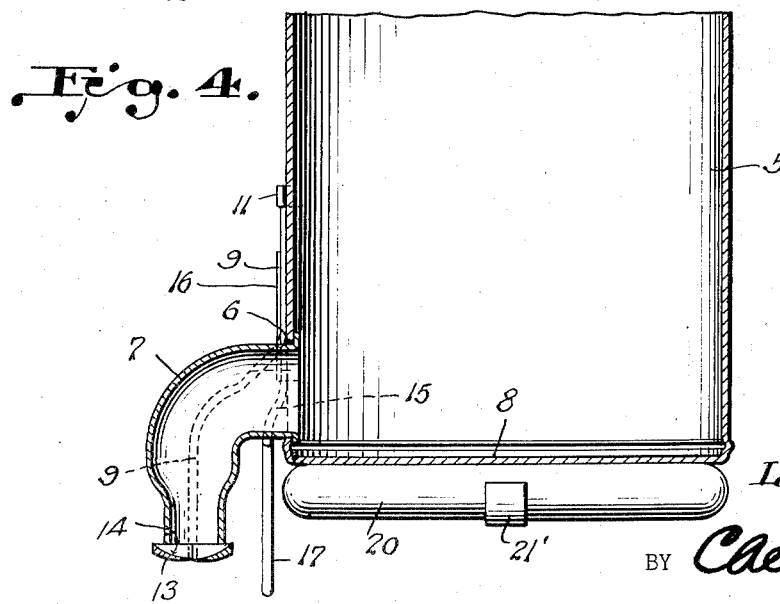
L. F. Wasson
INVENTOR
BY *Ce Knowles.*
ATTORNEYS.

Patented Mar. 23, 1954

2,672,830

UNITED STATES PATENT OFFICE 2,672,830

DEVICE FOR DROPPING CREAMY SUBSTANCES IN MAKING CANDY WAFERS

Louis F. Wasson, Tacoma, Wash.

Application February 16, 1953, Serial No. 337,175

3 Claims. (Cl. 107—52)

This invention relates to an apparatus designed primarily for use by confectioners in dropping designed quantities of creamy substances used in the manufacture of candy wafers.

An important object of the invention is to provide a device of this character embodying a container with a delivery spout and means for cutting off measured quantities of the creamy substance in such a way that wafers of the desired size may be insured even when the device is operated by a novice.

Still another object of the invention is to provide a pair of jaws movable over the discharge end of the delivery spout of the device, which jaws operate to cut off the quantities of material in forming the wafers.

Another important object of the invention is to provide means in the form of a push rod which extends below the bottom of the container so that the container may be lowered onto a supporting surface, the jaws being automatically opened by pressure exerted on the container by the operator, permitting a stronger spring action for quick closing action for severing a quantity of creamy substance.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings,

Fig. 3 is a side elevational view of the device.

Fig. 4 is a fragmental vertical sectional view through the container.

Fig. 5 is a sectional view taken on line 5—5 of Fig. 3.

Figure 1:
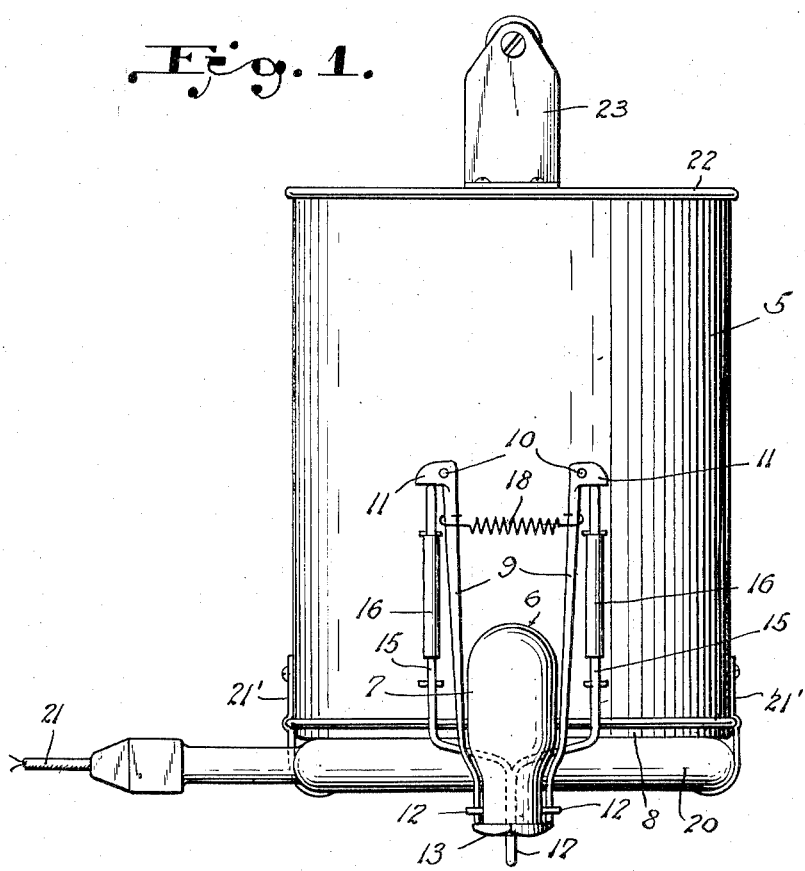
Figure 1 is a front elevational view of a device constructed in accordance with the invention.
Figure 2:
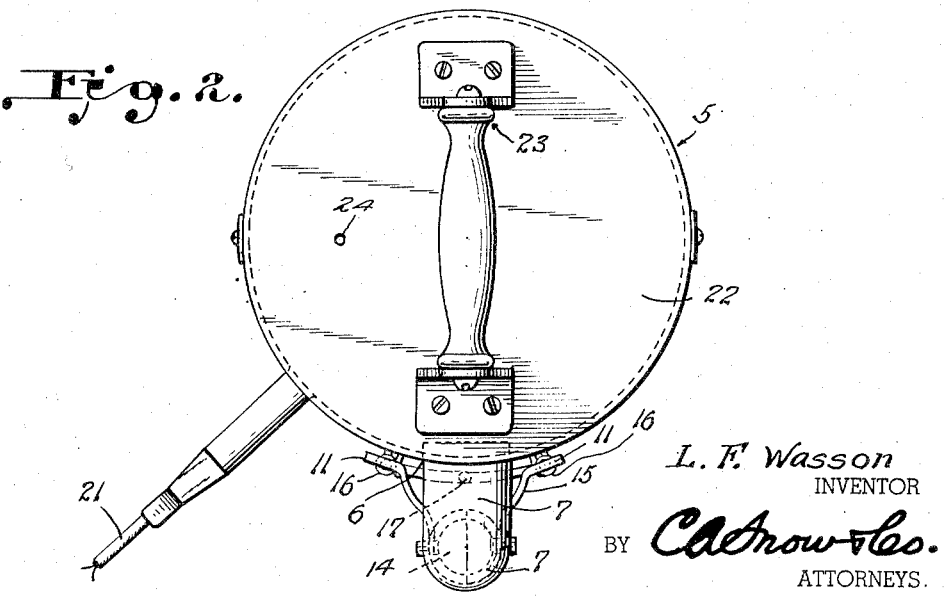
Fig. 2 is a plan view thereof.

Referring to the drawings in detail, the container or body portion of the device is indicated generally by the reference character 5 and in the present showing, is circular in formation.

The container 5 is provided with the discharge opening 6 disposed adjacent to the bottom thereof, into which the upper end of the spigot or delivery tube 7 extends, the spigot or delivery tube 7 being disposed downwardly terminating at a point below the bottom 8 of the container.

The reference character 9 indicates arms that are pivotally connected with the outer surface of the container 5, at 10, the arms having laterally extended heads 11 at their upper ends, while the opposite ends of the arms operate through guides 12 that extend laterally from the spigot or delivery tube 7, as clearly shown by Fig. 5 of the drawings.

As clearly shown by Fig. 1 of the drawings, these arms 9 converge towards their lower ends and terminate at points adjacent to the discharge end of the spigot or delivery tube 7, where they provide supports for the blades 13 which have concave inner surfaces 14, which surfaces have a tendency to direct the creamy substance discharged towards the cutting edges of the blades. Thus it will be seen that due to this construction, the material which is retained in the convex surfaces of the blades, will be carried off by the creamy substance passing from the container upon reopening of the blades. The actuating member for actuating the arms 9 embodies a pair of push rods 15 that move through the tubular guides 16 secured to the outer surface of the container 5, as clearly shown by the drawings. These push rods engage the lower surfaces of the heads 11, the lower ends of the push rods 15 extending inwardly where they merge into the rod 17 that is of a length to extend below the blades 13.

As shown more clearly by Fig. 1 of the drawings, the coiled spring 18 that connects with the arms 9, may by moving the spring longitudinally of the arms 9 regulate the tension of the spring 18 to cause the arms 9 to move inwardly gradually, or at a more rapid rate of speed, depending on the nature of the creamy substance being dispensed in forming wafers.

The guides 12 are elongated, as shown by Fig. 5 of the drawings, so that free lateral movement of the arms 9 will be permitted at all times.

Removably secured to the bottom of the container or body is the electric heating unit 20 which is of conventional structure and is provided with the electric wire 21 through which electric current is supplied to the electric heating unit to maintain the creamy substance dispensed by the device in a heated condition to flow readily from the container.

Clips indicated at 21 are connected with the heating unit and provide means for removably connecting the heating unit to the body.

The container or body is closed by the cap 22 to which the handle 23 is connected, the fit between the cap 22 and container being such that an exceptionally tight fit is provided so that the container together with its contents may be lifted and handled by means of the handle 23. The usual vent opening indicated at 24 is provided to permit the ready flow of material from the container when the spigot is opened.

In the use of the device in depositing creamy substance in the manufacture of candy wafers, the container is filled with the creamy substance to be dispensed.

The handle is now grasped by the operator and the device is lowered onto a surface, the weight of the container and material held therein being sufficient to cause the container to move downwardly with the rod 17 resting on the surface. As the container moves downwardly, the push rods 15 move into engagement with the lower surfaces of the heads 11 of arms 9 causing the lower ends of the arms 9 together with the blades 13, to swing outwardly away from the discharge end of the spigot or delivery tube 7 discharging a quantity of creamy substance sufficient for the proper formation of a candy wafer.

When the container is lifted, it is obvious that the spring 18 will operate to move the arms 9 towards each other, causing the blades 13 to cut a quantity of creamy substance from the flow of creamy substance. This operation is of course repeated until the desired number of wafers have been provided.

Having thus described the invention, what is claimed is:

1. A device of the class described, comprising a container, a spigot connected with the container through which material is discharged from the container, a pair of arms pivotally mounted on the container at opposite sides of the spigot, blades extending inwardly from said arms, movable under the discharge end of the spigot for controlling the discharge of material from said spigot, said blades having concave inner surfaces, push rods slidably mounted on the outer surface of said container, said push rods engaging said arms for moving the arms and blades away from each other, a rod to which said push rods are connected, the latter rod extending downwardly below said blades and adapted to engage the surface on which the container is placed for operating said rods and blades.

2. A device of the class described, comprising a container, a spigot connected with the container through which material is discharged from the container, a pair of arms pivotally mounted on the container at opposite sides of the spigot, blades extending inwardly from said arms below the discharge end of said spigot and movable under the discharge end of the spigot for controlling the discharge of material from said container, push rods slidably mounted on the wall of the container operating on opposite sides of the spigot, said push rods merging into a single rod extending below the bottom of the container and adapted to engage the surface on which the container is positioned, thereby effecting operation of said arms for opening the blades, and spring means connecting the arms for biasing the arms and blades towards each other, and thus controlling the discharge of material from the spigot.

3. A device of the class described, comprising a container, a spigot connected with the container through which material is discharged from the container, a pair of arms pivotally mounted on the container at opposite sides of the spigot, blades secured at the lower ends of said arms for operating in contact with the discharge end of the spigot and thereby controlling the passage of material from the container, heads formed at the upper ends of said arms, push rods contacting with the heads, said push rods merging into a single rod extending below said blades for contact with the surface on which material is being deposited, said push rods effecting outward movement of said arms and separating said blades for releasing material, and a coiled spring connected between said arms for normally biasing the arms and blades towards each other.

LOUIS F. WASSON.

References Cited in the file of this patent
UNITED STATES PATENTS

| Number | Name | Date |
|---|---|---|
| 573,432 | Megson | Dec. 15, 1896 |
| 849,867 | Thorne | Apr. 9, 1907 |
| 2,055,582 | Lewis | Sept. 29, 1936 |
| 2,204,019 | Koppers | June 11, 1940 |
| 2,310,251 | Mashon | Feb. 9, 1943 |